United States Patent [19]

Wimbush

[11] Patent Number: 4,494,119

[45] Date of Patent: Jan. 15, 1985

[54] DISTRESS RADIOLOCATION METHOD AND SYSTEM

[75] Inventor: Fred Wimbush, Toronto, Canada

[73] Assignee: 122923 Canada Limited, Toronto, Canada

[21] Appl. No.: 520,327

[22] Filed: Aug. 4, 1983

[51] Int. Cl.³ .......................... H04B 7/185; G01S 5/02
[52] U.S. Cl. ...................................... 343/457; 343/465
[58] Field of Search .............. 343/457, 465, 463, 450, 343/458; 340/22, 32, 33, 991–993, 989

[56] References Cited

U.S. PATENT DOCUMENTS

| | | | |
|---|---|---|---|
| 941,565 | 11/1909 | Fessenden. | |
| 2,204,438 | 6/1940 | Neufeld. | |
| 3,137,854 | 6/1964 | Anderson. | |
| 3,419,865 | 12/1968 | Chisholm. | |
| 3,430,243 | 2/1969 | Evans | 343/465 |
| 3,440,635 | 4/1969 | Hull | 340/539 |
| 3,518,674 | 6/1970 | Moorehead et al. | |
| 3,531,801 | 9/1970 | Huebscher. | |
| 3,680,121 | 7/1972 | Anderson et al. | 343/457 |
| 3,793,635 | 2/1974 | Potter. | |
| 3,848,254 | 11/1974 | Drebinger et al. | |
| 3,886,553 | 5/1975 | Bates. | |
| 3,922,678 | 11/1975 | Frenkel | 343/457 |
| 3,997,868 | 12/1976 | Ribnick et al. | 343/386 |
| 4,112,421 | 9/1978 | Freeny, Jr. | 343/457 |
| 4,209,787 | 6/1980 | Freeny, Jr. | |

Primary Examiner—Theodore M. Blum
Assistant Examiner—Gregory C. Issing
Attorney, Agent, or Firm—Banner, Birch, McKie & Beckett

[57] ABSTRACT

A dedicated distress radiolocation system combines direction-finding techniques with calculations based on signal strength to precisely locate a distress transmission and effect rescue of the person or property in distress. The system is capable of locating a distress transmission solely on the basis of a short duration pulse; however, for identification purposes and for communication reliability a series of pulses is transmitted. The system includes distress transmitters, a plurality of slave repeater units at known locations to receive the distress transmission and report their signal strength to a central station, a central station to calculate the distress transmitter's location based on the measured signal strengths and the known locations of the repeater units and to dispatch a rescue unit, and rescue units equipped with direction finding equipment to approach the distress transmitter. Most actions of the system are undertaken automatically.

25 Claims, 8 Drawing Figures

DISTRESS RADIOLOCATION METHOD AND SYSTEM

TECHNICAL FIELD

This invention relates to determining the location of distress radio transmissions, and the use of rescue units to respond to the transmissions, within a predetermined area covered by receivers whose locations are known.

BACKGROUND OF THE INVENTION

When a vehicle is in distress, radio is often used to communicate that fact to others and to summon assistance. For example, on the high seas when a ship is in grave danger it will broadcast the international distress signal on dedicated distress frequencies upon which all vessels maintain watch. If a vessel receives a distress signal, it is obligated to render such assistance as may be required and to deviate from its planned course if necessary. Of course, there is little to guarantee that a transmitted distress signal will be received or, if it is received, that the recipient will render assistance.

On a smaller scale, persons or vehicles within the limits of a city may also find themselves in danger. Here, however, since most land-based travelers are not equipped with radio stations, the distress call is made by any available means, such as shouting. Once again, for a number of reasons, the call may go unanswered.

For these persons or vehicles (especially vehicles transporting valuable cargoes), more reliability may be desired in the response to a distress signal; and the desired level of reliability may justify providing a distress radio transmitter. Such a transmitter for personal use is described in Hull, U.S. Pat. No 3,440,635 (Apr. 22, 1969). Hull describes a personal alarm transmitter to be used by a crime victim to summon police to the scene. When the victim surreptitiously activates his concealed transmitter, police, both at fixed locations and in automobiles, use direction-finding equipment to locate the source of the signal. The transmission may be modulated to indicate the transmitter's approximate location (in the event that it is normally located in a particular area) or its identity.

Since direction-finding (DF) equipment is used, all that is needed to determine the direction of the transmitter from the receiver is the presence of a radio signal on the distress frequency. Two or more sets of DF equipment can then locate the transmitter. One difficulty with DF is that it requires a signal of relatively long duration (or one which is repeated many times) in order to obtain a fix, whereas, in an emergency, it may not be possible to transmit more than a signal of short duration.

The Hull system suffers from other drawbacks: First, it is not a dedicated system. The police, in addition to listening for distress radio transmissions, have other duties which may interfere with locating the distress transmitter (or even take precedence over it). Also, the Hull system is slower and less effective because it relies to a great extent on actions taken by humans rather than actions performed automatically.

Some prior art systems which do not use DF for navigational purposes use instead the signal strength of a transmitted signal. (By "signal strength" is meant the field intensity or flux density of the transmitted energy.) For example, Frenkel U.S. Pat. No. 3,922,678 (Nov. 25, 1975) discloses an arrangement which may be used to locate emergency radio transmissions in an area, such as a city, where numerous receivers have been pre-positioned at intersections of a coordinate grid. The sensitivity and location of the receivers, and the power output of the emergency transmitter, are adjusted so that (a) a transmission at any point in the area of coverage will be received by at least two receivers, and (b) each combination of receivers at which a given transmission can be received corresponds to a unique zone within that area. The transmitter is activated either by a police officer when in pursuit of a crime suspect or by police intending to track a package in the possession of a suspect. Each receiver in the area of coverage is connected to a relay station which relays the fact of receipt or non-receipt of the transmitter's signal to the police station, where the transmitter's path can be followed.

The Frenkel system, while providing some degree of automatic radiolocation capacity, is unable to locate a transmitter precisely because it divides the area of coverage into zones and only determines, for each zone, whether a transmitter is present there. For greatly increased accuracy, a much larger number of zones (and receivers) would be required. Furthermore, Frenkel does not include means for rescuing a crime victim who is sending an emergency transmission. The system merely follows, from a central station, the progress of the transmitter throughout the city. Nor would the system disclosed be suitable for personal emergency rescue, for two reasons. First, the transmitter must operate continuously in order to allow the operator at the central station to monitor its location. Second, transmitter power must be precisely controlled because the accuracy of the system (limited as it is) is strictly dependent upon the size and shape of the receiver fields, which must remain fixed.

SUMMARY OF THE INVENTION

It is an object of the present invention to locate emergency transmissions based on signal strength.

It is another object of the present invention to locate emergency transmissions regardless of different levels in the power of the emergency transmission, and without knowledge of the transmitter power.

it is another object of the present invention to locate emergency transmissions of short duration.

Another object of the present invention is to accomplish the above objects in an automatic system.

Another object of the present invention is to provide a dedicated emergency rescue system.

Another object of the present invention is to use a combination of signal strength and DF techniques to locate emergency transmissions and effect rescue.

The invention combines several major classes of equipment in an integrated system for the automatic detection and location of emergency transmissions and dispatch of rescue units.

One class of equipment is the miniature transmitter (target transmitter) to be worn by the person being protected or installed in a vehicle. It is easily actuated to transmit a signal recognizable by the system's receivers as a distress signal.

When the signal is sent, another class of equipment, the slave repeater units, detect it and determine, first, that it is a distress communication, and second, what its signal strength is. Although the slave repeater units measure an absolute signal strength, subsqunt processing of this information makes it unnecessary to know the transmitted power. Transmitters of widely differing power outputs may therefore be used with this system.

The slave repeater units are positioned at convenient locations throughout an area of coverage, such as a city, at intervals close enough that the lowest power distress signal expected will be received by at least three repeaters. After measuring signal strength, they relay it to the central station.

The third class of equipment, the central station, receives and processes information from all repeater units in the area. When one or more repeaters indicate that a distress transmission has occurred, the central station collects all signal strength measurements related to that transmission and compares them, scaling them if necessary to compensate for variations from the expected output power of the transmitter. The central station then calculates the exact location from which the emergency trnsmission was made, determines the identity of the nearest rescue unit, and dispatches that rescue unit to the calculated location.

The fourth class of equipment comprises the mobile rescue units. These are the only elements of the system which are not completely automatic in normal operation. Each mobile unit is a vehicle containing communication equipment for receiving distress transmissions (the same ones received by the slave repeater units) and instructions from the central station and for transmitting information (such as its own location) to the central station. It also contains DF equipment to home in on the location of a distress transmission. Upon receipt of a command from the central station, the rescue unit operator approaches the calculated location of the target transmitter, keeping the DF equipment tuned to the distress frequency. The vehicle is operated to intercept the target using information from both the DF equipment and the calculated target location.

Other objects and features of the present invention will be apparent from the following specification read in connection with the accompanying drawings.

DETAILED DESCRIPTION OF THE PREFERRED EMBODIMENT

Figure 1:
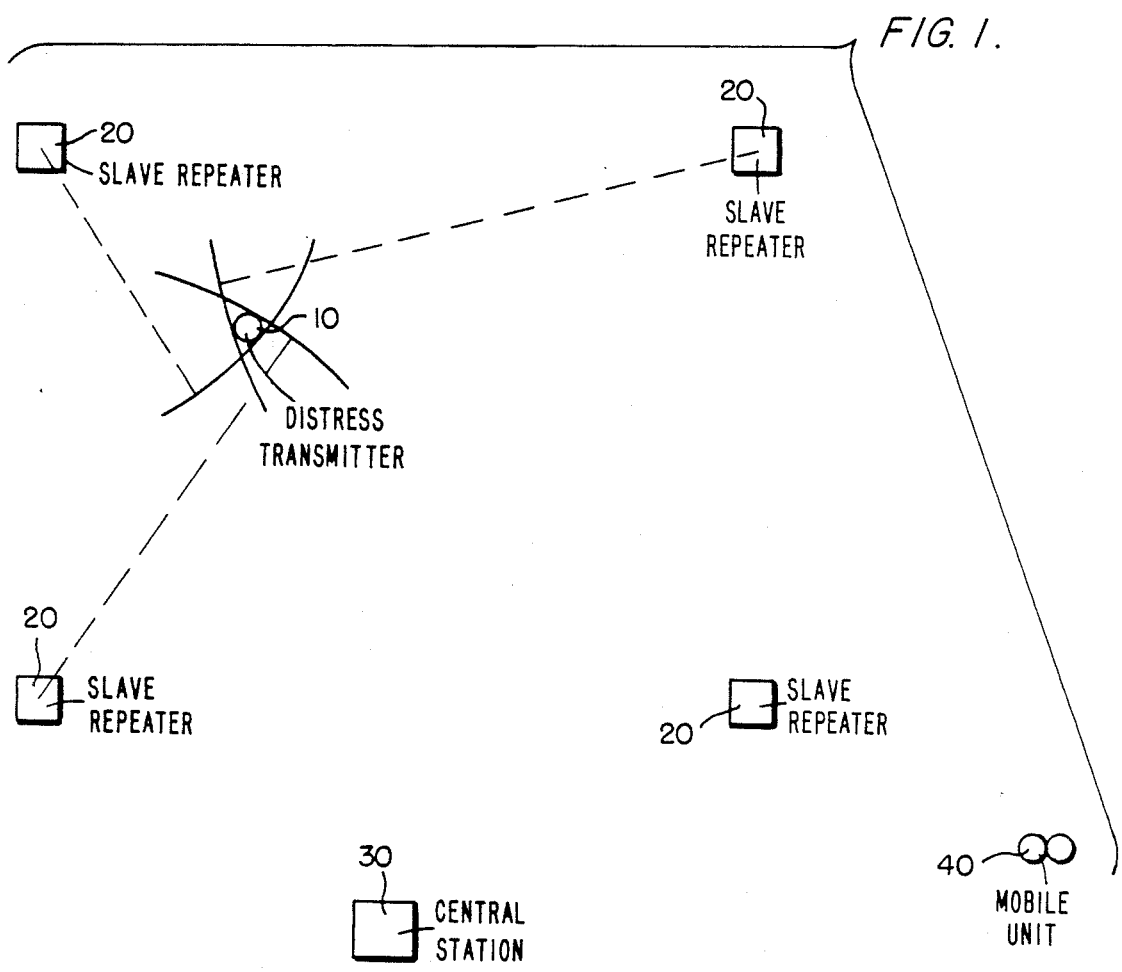
FIG. 1 is an overall system diagram of a distress radiolocation system constructed in accordance with the present invention.

FIG. 1 is an overall system diagram of a distress radiolocation system constructed in accordance with the present invention. Distress transmitter 10 radiates a signal which, in the preferred embodiment, comprises a series of 150 ms pulses recurring at 1.5 s intervals. Although a single pulse would be sufficient to locate the transmitter, for increased reliability (and to enable the mobile units to use DF equipment) a steady stream of pulses may be transmitted.

These pulses are, preferably, received by at least three slave repeater units 20, whose locations are known to the system. When each repeater 20 recognizes a distress transmission, it automatically measures the signal strength and formats a message for transmission to the central station. The message includes the identity of the repeater and the identity (if known) and signal strength of the distress transmission. The message will be repeated until it is acknowledged by the central station, after which the repeater will resume a standby mode, waiting for new distress signals.

At the central station 30, the messages from all repeaters 20 are received and interpreted. Using the known locations of the repeaters, the signal strength of the distress transmissions received by them, and the relationship between signal strength and distance established during calibration of each repeater, the central station automatically calculates the location of target transmitter 10. It then transmits the target location, in grid coordinates, to the mobile unit nearest the target, repeating the message until it is acknowledged.

Mobile unit 40, one of a plurality of such units (the number determined in accordance with service requirements), acknowledges the message from central station 30 and proceeds to the calculated location of target transmitter 10 while monitoring the distress frequency with its DF equipment to provide an exact target location for the intercept.

Target Transmitter

Two types of target transmitter 10 may be used with the preferred embodiment of this invention: a VHF transmitter which transmits the distress signal pulses unencoded with any additional information, and a UHF transmitter which encodes target identification into each 150 ms distress signal pulse. In general, the VHF transmitters are used for personal security within a city, while the UHF transmitters are preferred for long-range vehicle security (such as cross-country transportation of valuable cargo).

The VHF transmitter, with a power output of about ⅓ W, is powered solely by an internal battery; while the UHF transmitter, designed to radiate from 2.5 to 4.0 W, uses the vehicle battery for normal power and the internal battery for standby power. Both transmitters have high stability and shock- and weather-resistant packaging. The VHF transmitter is activated by a touch-sensitive manual TRANSMIT switch. The UHF transmitter may be activated by a signal from a VHF transmitter, by a motion detection switch, by a manual TRANSMIT switch, or by any of a variety of detection devices.

Slave Repeater Units

Figure 2:
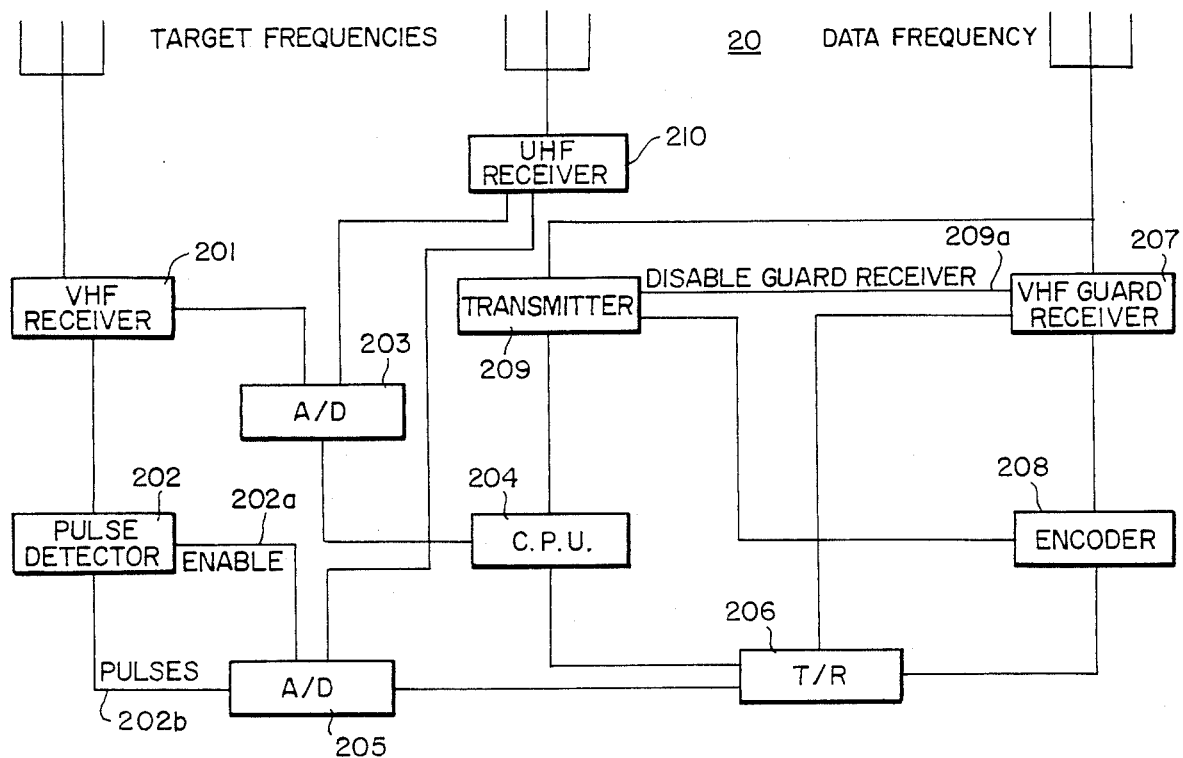
FIG. 2 is a block diagram of one of the slave repeater units employed in the present invention.

FIG. 2 is a block diagram of one of the slave repeater units 20. VHF receiver 201, which is a conventional receiver such as YAESU FTC 1525, receives distress signals from the VHF target transmitters and demodulates them, sending the demodulated pulses to pulse detector 202. At the same time, the modulated signal is passed to A/D converter 203 which performs the signal strength measurement.

After signal strength is measured, it is sent to CPU 204 where it is stored. The function of pulse detector 202 is to enable A/D converter 205 upon receipt of a series of three pulses matching the characteristics of those emitted by distress transmitters 10. Consequently, it sends out an enable signal on line 202a whenever it detects three 150 ms pulses followed by three 1350 ms spaces. The pulses are passed through on line 202b to A/D converter 205. Converter 205 is an identification converter, providing an indication that a complete distress transmission has been received and that the resulting signal strength measurement should be transmitted to the central station.

The identification signal is sent to transmit-receive switch 206, which makes the decision whether to transmit immediately or wait. This decision is based upon whether VHF guard receiver 207, which monitors the communication channel between repeater units 20 and central station 30, indicates that the channel is in use. If the channel is in use, transmit-receive switch 206 does nothing. When the channel is clear, switch 206 signals CPU 204 that a transmission to the central station may be made.

In an environment in which multiple repeater stations 20 may be signaling central station 30 nearly simultaneously, it is necessary to introduce some order. For this reason, a predetermined delay is built into transmit-receive switch 206, the delays being different for each repeater unit 20. This causes transmissions from repeater units 20 to central station 30 to arrive in a known order, making processing easier.

Upon receipt of the "go" signal from switch 206, CPU 204, which has been storing the measured signal strengths from A/D converter 203, averages the most recent three signal strength measurements and transfers this information to encoder 208. The encoder formats a message consisting of the identification of its repeater unit, the target identification, if present, and the signal strength measurement. It then activates transmitter 209 to transmit this information to central station 30. During transmission, transmitter 209 disables guard receiver 207 over line 209a.

A similar series of events occurs when a UHF distress transmission is intercepted. UHF receiver 210 sends the modulated signal to A/D converter 203 for signal strength measurement. However, since receiver 210 includes a digital decoder, it is unnecessary to use pulse detector 202 to detect a series of three distress signal pulses. When three pulses of the proper format are received, the demodulated pulses are sent by receiver 210 directly to A/D converter 205, which decodes the target identification information from the distress pulses. (Target identification is only supplied with UHF distress signals.)

Figure 3:
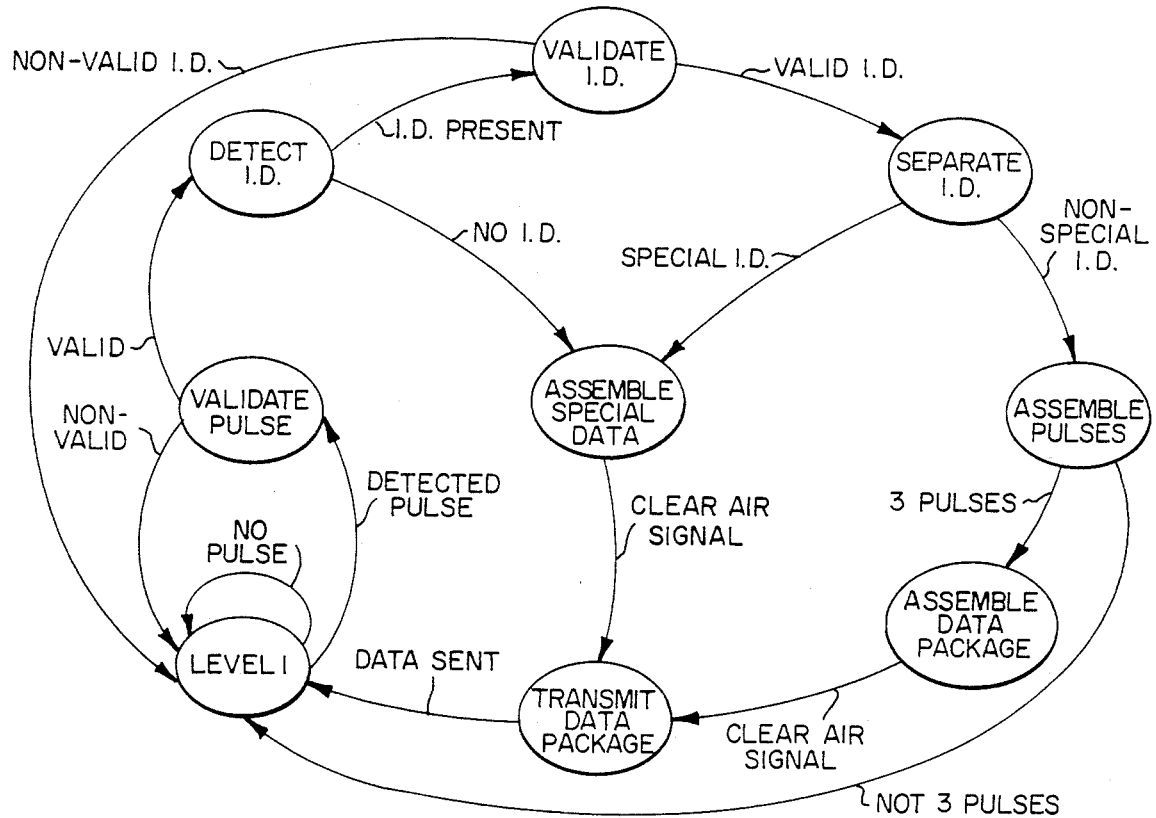
FIG. 3 is a flow chart illustrating the operation of the slave repeater unit of FIG. 2.

The flow chart of FIG. 3 illustrates the operation of slave repeater units 20. These units are unattended and require no operator intervention with the exception of being turned on. If the unit is inoperative, this fact will be determined by the central station.

The program is designed to operate as a loop back system which eventually always comes back to the same starting position. The lowest level loop has CPU 204 waiting for a pulse from pulse detector 202. This is the Level One node of the flow chart of FIG. 3.

Detection of a pulse moves the system into a single pass loop in which it validates the pulse. If it is invalid, the system drops down to the pulse detect loop. If the pulse is valid, it checks for encoded identification.

If there is an identification code associated with the target signal, it is compared with a table of valid identification codes (as well as being compared with previous or subsequent transmissions of the same distress signal).

If the identification is invalid, the system returns to level one and waits for more pulses. If it is valid, it is stored along with the associated signal strength measurement.

If the identification code is "special," that is, indicating that the pulse was transmitted from central station 30, a mobile unit 40, or a specially marked target transmitter, a special data package is assembled for transmission to the central station 30. The package includes, in addition to the standard data package described below, an indication (such as a flag) that the identification code is special.

After the repeater unit 20 has received three pulses, it averages the signal strengths and assembles a data package consisting of the identification of the repeater unit, target identification, if any, and the averaged signal strength. It then waits for the VHF guard receiver to indicate that the communication channel is clear, disables the receiver, enables the transmitter, waits for the predetermined delay period, and transmits the data package. The VHF guard reciever is then re-enabled, waiting for central station 30 to acknowledge receipt of the message. When acknowledgement is received, the system returns to level one.

Central Station

Figure 4:
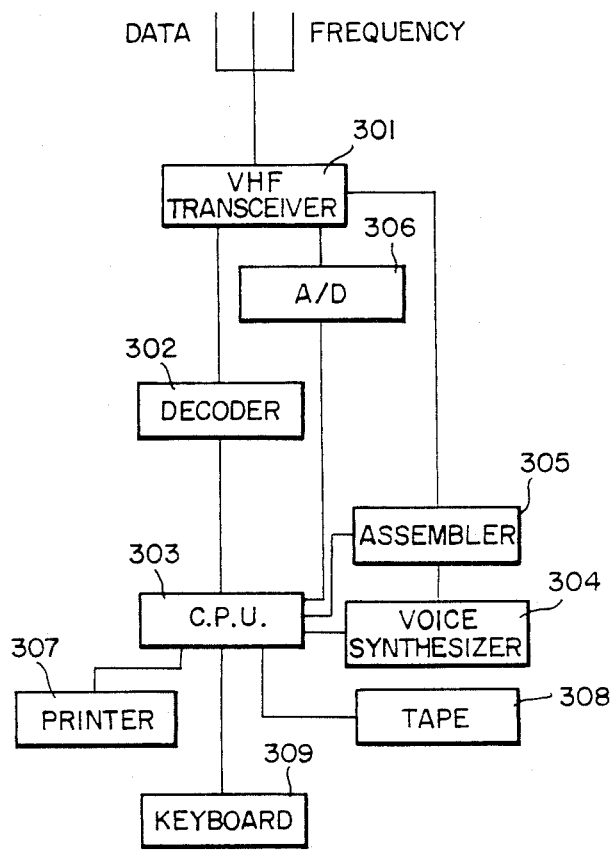
FIG. 4 is a block diagram of the automatic equipment of the central station employed in the present invention.

FIG. 4 is a block diagram of the automatic equipment at central station 30. The central station's communication link with both repeater units 20 and mobile units 40 is a conventional VHF transceiver 301, which may be a YAESU FTC 2640.

Upon receipt of a distress message from a repeater unit 20, transceiver 301 demodulates the message and sends it to decoder 302, which formats in parallel for transfer to CPU 303. CPU 303 performs a check for valid data and then stores the information. CPU 303 also calculates the distress transmitter's location, using the signal strengths reported by the repeater units, and generates a message to a mobile unit 40.

The message generated by CPU 303 is sent to voice synthesizer 304, which converts the message to human language for voice transmission to the mobile unit 40. Simultaneously, the message is sent as data to assembler 205, which assembles the voice-and-data message for transmission by transceiver 301.

A/D converter 306 is an optional piece of equipment which converts a subaudible tone received by transceiver 301 to digital data for processing by CPU 303. The subaudible tone may be used to identify the repeater unit 20 whose transmission is being received, to identify families of target transmitters 10, or to identify high priority transmitters.

All messages sent and received by central station 30 are recorded both on printer 307 and in magnetic storage, such as tape 308. Keyboard 309 is provided at the central station for operator input into the CPU.

Figure 5:
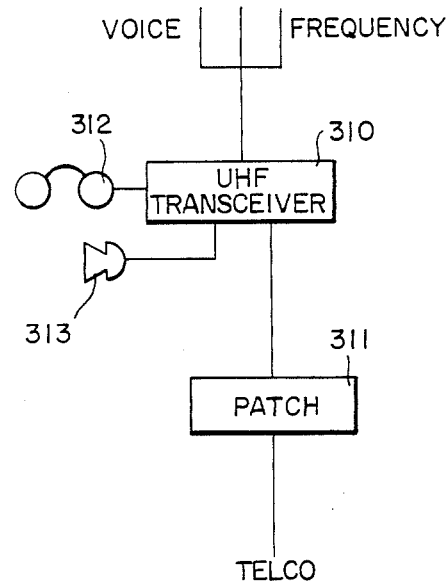
FIG. 5 is a block diagram of the voice communication equipment of the central station referred to in connection with FIG. 4.

Also provided at central station 30, as shown in FIG. 5, is voice communication equipment. This comprises conventional UHF transceiver 310, which may be a YAESU FTC 4625, and a telephone patch 311, providing access to local telephone lines for the operators of mobile units 40, through the UHF radio link. (Mobile operators may communicate by telephone directly with the police through their UHF radios and the automatic telephone patch.) To enable the operator of central station 30 to communicate with mobile units 40, UHF transceiver 310 is equipped with earphones 312 and microphone 313.

Figure 6:
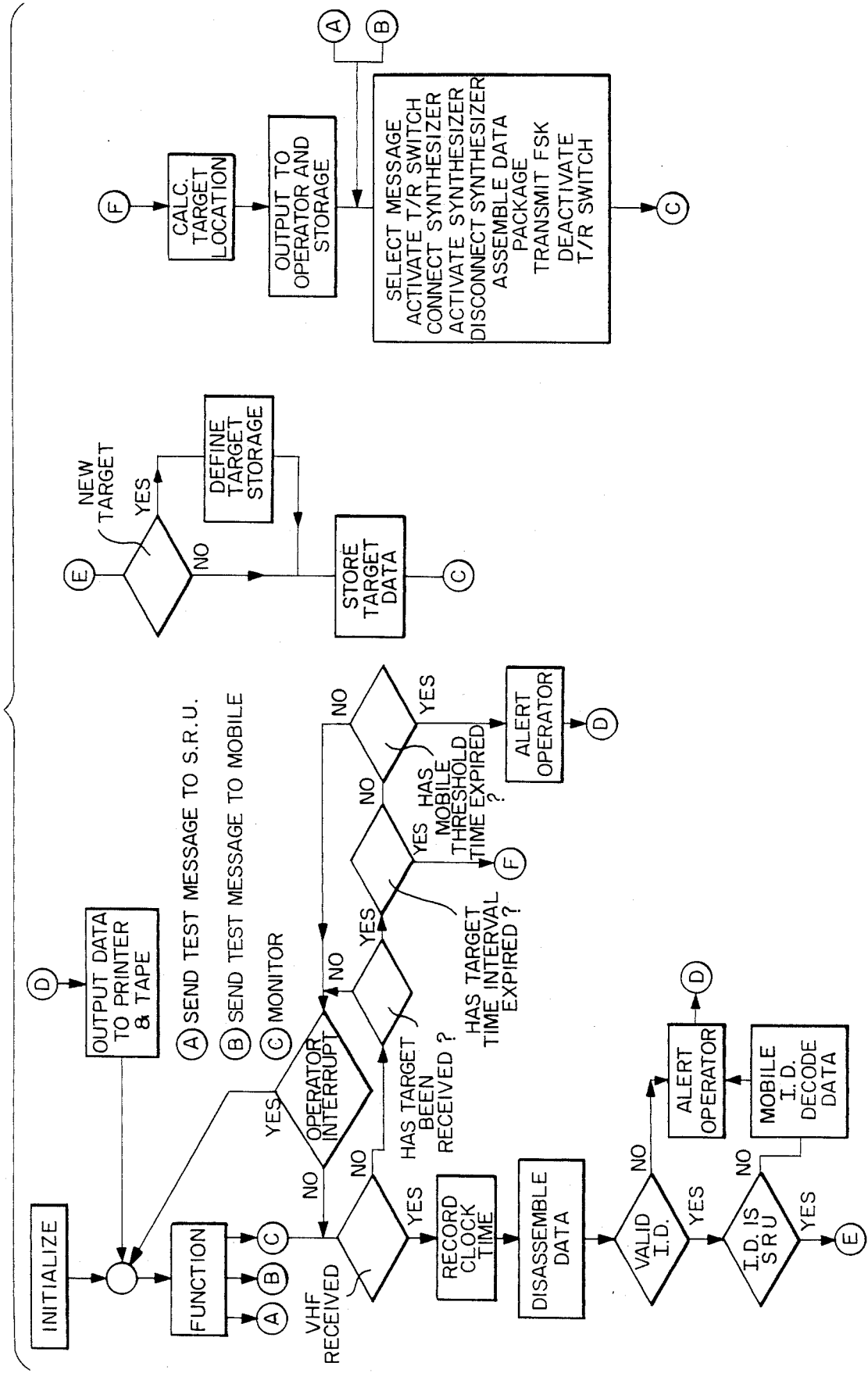
FIG. 6 is a flow chart illustrating the operation of the central station's automatic equipment shown in FIG. 4.

FIG. 6 is a flow chart illustrating the opertion of central station 30. The first step is initialization. At turn on, the operating system must initialize all the variables it will use in the program—calibration data peculiar to each slave location, etc.—and it must check the current status of the hardware peripherals. These include VHF transceiver 301, voice synthesizer 304, assembler 305, printer 307, and magnetic storage 308. Keyboard 309, an integral part of CPU 303, will be checked by the internal diagnostics. If there is a detectible fault with the system, the operator will be notified by a printed message. If the CPU has gone down, it will be evident.

After a successful initialization, the operator is permitted to choose one of several functions, in default of which (after a short time) the system will automatically enter the normal monitor routine. If the operator suspects that either a repeater unit 20 or a mobile unit 40 is disabled, he may select test routines (described below) which will temporarily bypass the monitor routine, generate a special test message package, transmit the package and then revert to the monitor routine.

The monitor routine is built around a series of tests of VHF transceiver 301 and keyboard 309. CPU 303 polls these two items alternately. During the times when the keyboard is being polled, the operator may interrupt the monitor routine to select one of the test routines.

If a transmission is received by VHF transceiver 301, the clock time will be recorded in a temporary register, while decoder 302 formats the message for the CPU, for use in notifying the operator. Upon receipt of the message, CPU 303 extracts the identification code and checks it for validity.

Invalid identification may be handled in one of two ways. It may be disregarded until a threshold is reached, at which time the operator would be alerted, in order to avoid losing any valid data during the operator's reaction time following the receipt of invalid data. (The threshold may be a predetermined period of time following receipt of the invalid data, or it may be a predetermined number of invalid identifications.) Alternatively, the operator could be alerted immediately and given the option of transmitting a test message.

If the identification is valid, the next test is to determine whether it is that of a repeater unit 20 or a mobile unit 40. Messages from mobile units are decoded and presented directly to the operator. Messages from the repeater units, however, are processed somewhat differently. First, they are decoded to determine the distress transmitter's identification, if any. If identification is present, and if the target transmitter so identified is not one for which data is being stored already (a new target transmitter), an area of buffer memory is assigned to the target; and its data, along with the clock time, is stored in this buffer area. For target transmissions which do not satisfy these criteria, time and data are simply stored in the existing buffer.

From this point, the system awaits transmissions from other repeater units 20 relative to this particular target transmitter. Since each repeater unit 20 has a built-in delay, the total time required for all repeater units to respond to a given distress transmission is known. At the end of this time, i.e., at the expiration of target time, the VHF receive channel is closed, and the distress transmitter's location is calculated. This target location is displayed to the operator of central station 30 as well as being transmitted in two formats to the mobile unit 40 nearest the calculated location. Based on the location, CPU 303 will formulate a message for voice synthesizer 304 and transmit the message via VHF transceiver 301. It will also send the target transmitter's location by FSK data to mobile unit 40 for additional assurance that the message will be received. After transmission, transceiver 301 will await acknowledgement from mobile unit 40; and, if the mobile unit does not respond within a predetermined time, central station 30 will transmit the target location again. After a predetermined number of repetitions of the message (expiration of mobile threshhold time), the central station operator will be notified.

During the time when central station 30 is processing and storing target transmitter data, it is advisable that mobile units 40 be data disabled. It is mandatory that repeater units 20 be disabled during the time when central station 30 is awaiting a response from mobile unit 40, otherwise, the central station will begin processing the new transmission without waiting for acknowledgement that the mobile unit received the earlier location.

Mobile Rescue Units

Figure 7:
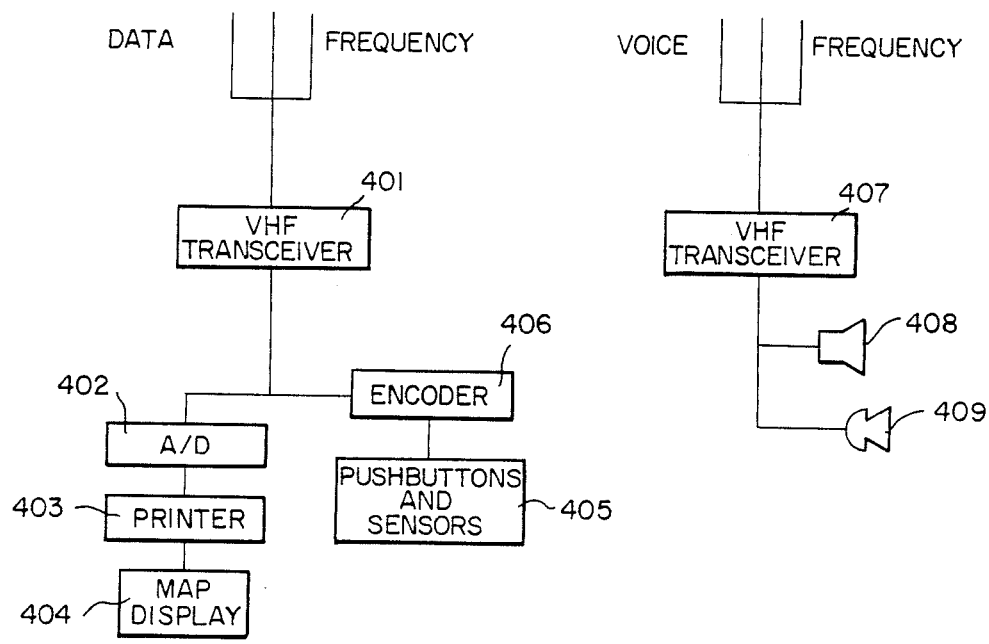
FIG. 7 is a block diagram of the data communication equipment of one of the mobile rescue units employed in the present invention.
Figure 8:
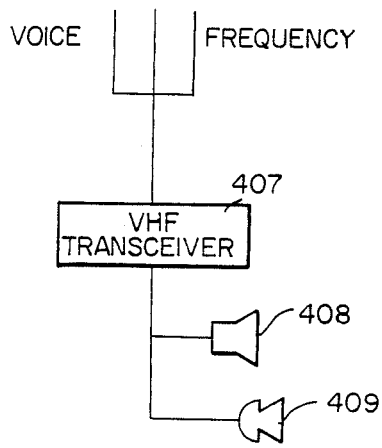
FIG. 8 is a block diagram of the voice communication equipment of the mobile unit referred to in connection with FIG. 7.

FIGS. 7 and 8 illustrate the two types of communications equipment carried by each mobile unit 40. For two-way data transfer, the units include a conventional VHF transceiver 401. Incoming data representing the location of a target transmitter is converted to digital form by A/D converter 402, after which it is both printed by printer 403 and displayed on map display 404. Outgoing data representing the status of mobile unit 40 is developed through various pushbuttons and sensors 405. The pushbuttons and sensors are capable of developing one of four messages to central station 30. In response to a message from central station 30 informing mobile unit 40 of a distress transmitter's location, an automatic acknowledgement is transmitted. The mobile operator may, by pushbutton, transmit a check-in message (including his location) or a mission complete message to central station 30. If, in response to a query from central station 30, no check-in message is sent by the operator, an automatic "vehicle empty" message will be sent. Each of these four messages is encoded by encoder 406 before transmission by VHF transceiver 401.

Mobile unit 40 also has voice capability, through UHF transceiver 497 and its connected speaker 408 and touchtone microphone 409. Microphone 409 enables the mobile unit operator to access the telephone system via central station 30 and phone patch 311, in order to notify the authorities that persons or property are in danger. Mobile unit 40 also carries fixed and portable VHF/UHF DF equipment in order to locate a distress transmission precisely or to intercept one in motion. This is especially important in locating a distress transmitter in a multistory building or a deliberately concealed vehicle.

Test and Calibration Messages

Each hour, central station 30 is responsible for initiating test routines. These routines perform two functions. First, they confirm that the equipment is operating. Second, they provide the mathematical relationship between signal strength and distance, as a function of azimuth, necessary to calculate distress transmitter location solely on the basis of signal strength.

One type of test transmission is made by repeater units 20 after receiving a request from central station 30. Central station 30 transmits the request on the frequency monitored by VHF guard receiver 207. Upon receipt of a request for a test transmission by guard receiver 207, encoder 208 initiates a standard test message and causes it to be transmitted via transmitter 209. This sequence tests the communication between repeater units 20 and central station 30.

Another type of test transmission is initiated by a dedicated mobile unit 40 (after a request by central station 30) and serves both to test the entire system and to provide data from which the relationship between signal strength and distance can be determined. A dedicated mobile unit is sent to known locations throughout the area of coverage to make simulated target transmissions. These are identical to ordinary target transmissions except for the identification contained within the pulses. This identification alerts the system to the fact that the data reported to the central station 30 is to be stored and used for future calculations rather than reported to a mobile unit for rescue. From a series of such transmissions from known locations throughout the area, sufficient data regarding the relationship between signal strength and distance for each repeater unit 20 can be accumulated so that an accurate distance determination may be made from a repeater unit's report of signal strength received. In this way, the accuracy of the system is maintained. Calibration routines performed by central station 30 allow for the "weighting" of a received signal strengths where extraordinary attenuation is evident due to environmental character observed during these mobile unit calibration runs.

I claim:

1. A system for locating a signal source transmitting a short duration signal from an unknown location within an area of coverage, said system comprising:
   receiving means at a plurality of known geographical locations for receiving the short duration signal, said receiving means including measuring means for developing a numerical representation of a magnitude of the received signal at each known location; and
   calculating means for numerically calculating, from the numerical representations and the known locations, the geographical location of the signal source.

2. A system as claimed in claim 1 wherein the known locations comprise at least three locations.

3. A system as claimed in claim 1 wherein the signal is a radio signal and said measuring means develops a numerical representation of the received signal strength of the radio signal.

4. A system as claimed in claim 1 wherein the signal identifies the signal source, said receiving means further including identification means for associating the identity of the signal source with the numerical representation.

5. A system as claimed in claim 1 wherein said signal source has an unknown power output.

6. A system as claimed in claim 1 wherein said short duration signal is not longer than about 150 ms.

7. A system as claimed in claim 1 further comprising calibration transmitter means positionable at a predetermined position within the area of coverage for transmitting to said receiving means a signal of known power output, said measuring means developing a numerical representation of a magnitude of the signal of known power output at each known location.

8. A distress radio location system for locating a radio transmitter transmitting a short duration radio signal from an unknown location within an area of coverage, said distress radio location system comprising:
   a plurality of radio receivers at known geographical locations to receive the short duration radio signal;
   signal strength measuring means coupled to each of said receivers for developing a numerical representation of a signal strength of the radio signal received at the known locations; and
   calculating means for numerically calculating, from the numerical representations and the known locations, the geographical location of the transmitter.

9. A system as claimed in claim 8 wherein said radio transmitter has an unknown power output.

10. A system as claimed in claim 8 wherein said short duration signal is not longer than about 150 ms.

11. A system as claimed in claim 8 further comprising calibration transmitter means positionable at a predetermined position within the area of coverage for transmitting to said receivers a radio signal of known power output, said signal strength measuring means developing a numerical representation of a signal strength of the radio signal of known power output at each known location.

12. A method of locating a signal source transmitting a short duration signal from an unknown location, said method comprising the steps of:
   developing a numerical representation of a magnitude of the short duration signal at each of a plurality of known geographical locations; and
   numerically calculating, from the numerical representations and the known locations, the geographical location of the signal source.

13. The method of claim 6 wherein said step of numerically calculating the location of the signal source is carried out at a central station remote from at least one of the known locations, said method further comprising the step of transmitting the numerical representation associated with said one known location to the central station.

14. The method of claim 6 further comprising the steps of identifying the source of the short duration signal and associating the identity of the signal source with the numerical representation.

15. A method as claimed in claim 12 wherein said signal source has an unknown power output.

16. A method as claimed in claim 12 wherein said short duration signal is not longer than about 150 ms.

17. A method as claimed in claim 12 further comprising the initial step of determining a relationship between a numerical representation of a magnitude of a calibration signal and distance from each known location, the location of the signal source being calculated from the numerical representations, the known locations, and the relationships.

18. A method of establishing a line of position to locate a signal source trnasmitting a target signal from an unknown location, said method comprising the steps of:
   transmitting a calibration signal from a predetermined position;
   developing a numerical representation of a magnitude of the calibration signal at a known location;
   determining a relationship between the numerical representation of the magnitude of the calibration signal, the predetermined position, and the known location;
   developing a numerical representation of the magnitude of the target signal at the known location; and
   numerically calculating, from the numerical representation of the magnitude of the target signal, the known location, and the relationship, a line of position locating the signal source.

19. In a system for locating a signal source transmitting a signal from an unknown location, the system including as an old element calculating means receiving input information for numerically calculating the location of the signal source, a repeater unit comprising:
- receiver means for receiving the signal;
- measuring means coupled to said receiver means for developing a numerical representation of a magnitude of the signal;
- encoding means coupled to said measuring means for formatting the numerical representation and an identification of said repeater unit into a message; and
- transmitter means coupled to said encoding means for transmitting the message to the calculating means as the input information.

20. The repeater unit of claim 19 further comprising identification means coupled to said receiver means and said encoding means for causing said encoding means to format the message when a complete signal has been received.

21. The repeater unit of claim 19 further comprising storage means coupled to said measuring means for storing the numerical representations, said encoding means being coupled to said storage means.

22. The repeater unit of claim 19 wherein the signal is a radio signal.

23. The repeater unit of claim 22 wherein the magnitude is the received signal strength of the radio signal.

24. A system for locating a signal source transmitting a series of short duration signals from an unknown location, said system comprising:
- receiving means at a plurality of known locations for receiving at each known location a plurality of the short duration signals, said receiving means including measuring means for developing a numerical representation of a magnitude of each of the received signals at each known location;
- calculating means for numerically calculating, from the numerical representations and the known locations, the location of the signal source; and
- mobile means in communication with said calculating means for approaching the calculated location of the signal source, said mobile means including direction finding means for precisely locating the signal source.

25. A distress radio location system for locating a radio transmitter transmitting a series of short duration radio signals from an unknown location, said distress radio location system comprising:
- a pluarality of radio receivers at known locations to receive at each known location a plurality of the short duration radio signals;
- signal strength measuring means coupled to each of said receivers for developing a numerical representation of a signal strength of each of the received radio signals at each known location;
- calculating means for numerically calculating, from the numerical representations and the known locations, the location of the transmitter; and
- mobile direction finding means in communication with said calculating means for approaching the calculated location of the transmitter.

* * * * *